US010848392B2

(12) United States Patent
Kapinos et al.

(10) Patent No.: US 10,848,392 B2
(45) Date of Patent: Nov. 24, 2020

(54) SYSTEMS AND METHODS TO USE DIGITAL ASSISTANT TO JOIN NETWORK (71) Applicant: Lenovo (Singapore) Pte. Ltd., Singapore (SG)

(72) Inventors: Robert James Kapinos, Durham, NC (US); Scott Wentao Li, Cary, NC (US); Timothy Winthrop Kingsbury, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 326 days.

(21) Appl. No.: 15/897,903

(22) Filed: Feb. 15, 2018

(65) Prior Publication Data
US 2019/0253324 A1    Aug. 15, 2019

(51) Int. Cl.
| *H04L 12/24* | (2006.01) |
| *H04L 29/06* | (2006.01) |
| *H04L 12/06* | (2006.01) |
| *G10L 17/24* | (2013.01) |
| *G10L 15/22* | (2006.01) |
| *G06F 3/16* | (2006.01) |
| *H04W 12/08* | (2009.01) |
| *H04W 84/12* | (2009.01) |
| *G10L 17/00* | (2013.01) |
| *H04W 12/06* | (2009.01) |

(52) U.S. Cl.
CPC ............. *H04L 41/22* (2013.01); *G06F 3/167* (2013.01); *G10L 15/22* (2013.01); *G10L 17/24* (2013.01); *H04L 41/0816* (2013.01); *H04L 63/083* (2013.01); *H04L 63/0838* (2013.01); *H04L 63/0876* (2013.01); *H04W 12/06* (2013.01); *G10L 17/00* (2013.01); *G10L 2015/223* (2013.01); *H04W 12/08* (2013.01); *H04W 84/12* (2013.01)

(58) Field of Classification Search
CPC . H04L 41/22; H04L 63/0861; H04L 41/0816; H04L 63/083; H04L 63/0876; H04L 63/0838; G06F 3/167; H04W 12/06; H04W 12/08; H04W 84/12; G10L 17/24; G10L 15/22; G10L 17/00; G10L 2015/223
See application file for complete search history.

(56) References Cited

U.S. PATENT DOCUMENTS

| 6,119,088 | A | * | 9/2000 | Ciluffo | ............... G10L 15/26 704/275 |
| 8,898,064 | B1 | * | 11/2014 | Thomas | ............ G06F 21/32 704/270 |
| 9,418,658 | B1 | * | 8/2016 | David | ............ H04M 1/64 |
| 9,674,187 | B1 | * | 6/2017 | Ngo | ............ H04L 63/0853 |
| 10,148,647 | B1 | * | 12/2018 | Vongsouvanh | ...... H04W 12/08 |
| 10,531,157 | B1 | * | 1/2020 | Loritsch | ......... H04N 21/43615 |

(Continued)

*Primary Examiner* — Michael R Vaughan
(74) *Attorney, Agent, or Firm* — John M. Rogitz; John L. Rogitz (57) ABSTRACT In one aspect, a first device includes a processor and storage accessible to the processor. The storage includes instructions executable by the processor to receive, via a digital assistant, input pertaining a second device joining a network. The instructions are also executable by the processor to use the input to assist the second device in joining the network.

20 Claims, 4 Drawing Sheets (56) References Cited

U.S. PATENT DOCUMENTS

| | | | |
|---|---|---|---|
| 2002/0007278 A1* | 1/2002 | Traynor | G10L 15/26 |
| | | | 704/275 |
| 2002/0065663 A1* | 5/2002 | Thomas | H04L 29/12783 |
| | | | 704/275 |
| 2004/0203408 A1* | 10/2004 | Wen | G09B 5/125 |
| | | | 455/66.1 |
| 2004/0203600 A1* | 10/2004 | McCorkle | G01S 7/023 |
| | | | 455/411 |
| 2011/0252229 A1* | 10/2011 | Belenkiy | H04L 9/0841 |
| | | | 713/155 |
| 2015/0088514 A1* | 3/2015 | Typrin | G06F 3/167 |
| | | | 704/249 |
| 2015/0373183 A1* | 12/2015 | Woolsey | H04M 1/7255 |
| | | | 348/14.08 |
| 2016/0005404 A1* | 1/2016 | Yokoya | H04N 21/4882 |
| | | | 704/275 |
| 2016/0262017 A1* | 9/2016 | Lavee | G06F 21/316 |
| 2017/0132199 A1* | 5/2017 | Vescovi | G06F 40/186 |
| 2018/0211651 A1* | 7/2018 | Hall | G10L 15/083 |
| 2018/0302284 A1* | 10/2018 | Roman | G06K 9/00315 |
| 2018/0314689 A1* | 11/2018 | Wang | G10L 15/22 |
| 2019/0003196 A1* | 1/2019 | Hall | G06F 1/1656 |
| 2019/0034604 A1* | 1/2019 | Zheng | H04L 63/0861 |
| 2019/0044745 A1* | 2/2019 | Knudson | G06F 3/167 |

* cited by examiner

SYSTEMS AND METHODS TO USE DIGITAL ASSISTANT TO JOIN NETWORK

BACKGROUND

As recognized herein, wireless network management is not as seamless and easy as it could be while still maintaining adequate network security to prevent unauthorized use of the network and possibly hacking of other devices connected to the network. For instance, static passwords for all devices to access a network are sometimes long and hard to remember owing to their seemingly random nature. Other times, detailed information about the devices seeking to join a network might be needed and users often do not have readily available access to such information. Still other times, a single network management terminal that might be at an inconvenient location might have to be operated by a network administrator to grant other devices access to the network. There are currently no adequate solutions to the foregoing computer-related, technological problem.

SUMMARY

Accordingly, in one aspect a first device includes at least one processor, a microphone accessible to the at least one processor, and storage accessible to the at least one processor. The storage includes instructions executable by the at least one processor to execute a digital assistant and receive, via the microphone, voice input pertaining to a second device. The instructions are also executable by the at least one processor to, based on the voice input, use the digital assistant to permit the second device to join the LAN.

In another aspect, a method includes receiving, via a digital assistant, voice input pertaining to a device for the device to join a local area network (LAN). The method also includes using, based on the voice input, the digital assistant to permit the device to join the LAN.

In yet another aspect, a computer readable storage medium includes instructions executable by at least one processor of a first device to receive, via digital assistant, input pertaining a second device joining a network. The instructions are also executable by the at least one processor to use the input to assist the second device in joining the network.

The details of present principles, both as to their structure and operation, can best be understood in reference to the accompanying drawings, in which like reference numerals refer to like parts, and in which:

DETAILED DESCRIPTION

In accordance with present principles, when a device attempts to access a local area network (LAN) such as a Wi-Fi network or wired local network in a personal residence or other environment, a user may be presented with a one-time use password or code on his or her personal device's display. The user may then provide the password/code to a digital assistant via voice input in a command for the device to be able to join the LAN. The digital assistant may then communicate with a management console (e.g., a network access point) that may then give the device access to the LAN for a threshold amount of time. This may be done since the management console may already know identifying information for the device, as might have been discovered based on broadcast packets sent to/from the device during a network discovery protocol, and it may pair that identifying information with the password/code. Accordingly, the user's device may be seamlessly and quickly added to an access list that the management console might maintain of devices that are approved to communicate over the LAN and the device may be provided with LAN access when the password/code is received via voice input. Then, at the end of the threshold amount of time, the management console may revoke the device's LAN access and purge the device's information from its access list, at which point the user's device may have to re-authenticate using a different one-time use code in order to continue communicating over the LAN.

Additionally, or alternatively, the digital assistant may audibly issue a one-time use password that the user may hear and then enter on his/her personal device when presented with a login screen for accessing the LAN. E.g., once the digital assistant/management console detects a new device via broadcast signals from the device and identifying information for that device is presented on its display responsive to detecting the network, the user may provide voice input detectable by the digital assistant that indicates, for example, "I need a password for device 1234567". The digital assistant may then audibly provide a one-time use password to the user for the user to enter at his/her device's login screen to access the LAN.

Furthermore, in some embodiments different levels of access may be provided to various end-user devices as might be specified by a network administrator of the LAN or a homeowner of the residence in which the LAN provides Internet access. For example, the homeowner may provide voice input indicating "Lenovo assistant, register network device 1234567 with child security" to give access per parental controls to a child's device, with the child security already having been configured by the homeowner. Additionally, the digital assistant may be programmed to not recognize visiting children as people able to give any access to the LAN.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
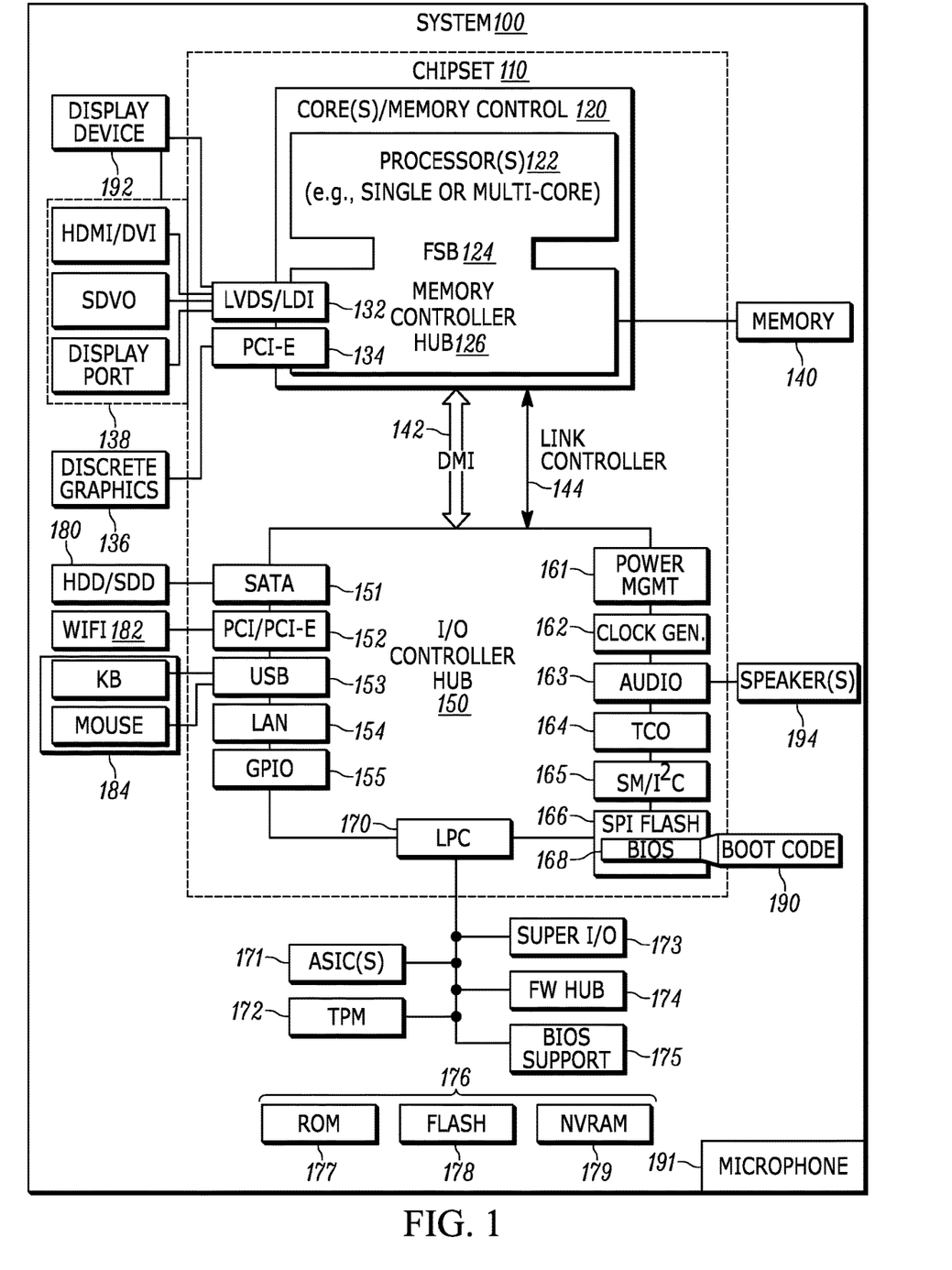
FIG. 1 is a block diagram of an example system in accordance with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMID®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc. via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller huh 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc. In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, 1310S support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include an audio receiver/microphone 191 that provides input from the microphone 191 to the processor 122 based on audio that is detected, such as via a user providing audible/voice input to the microphone in accordance with present principles.

Additionally, though not shown for clarity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
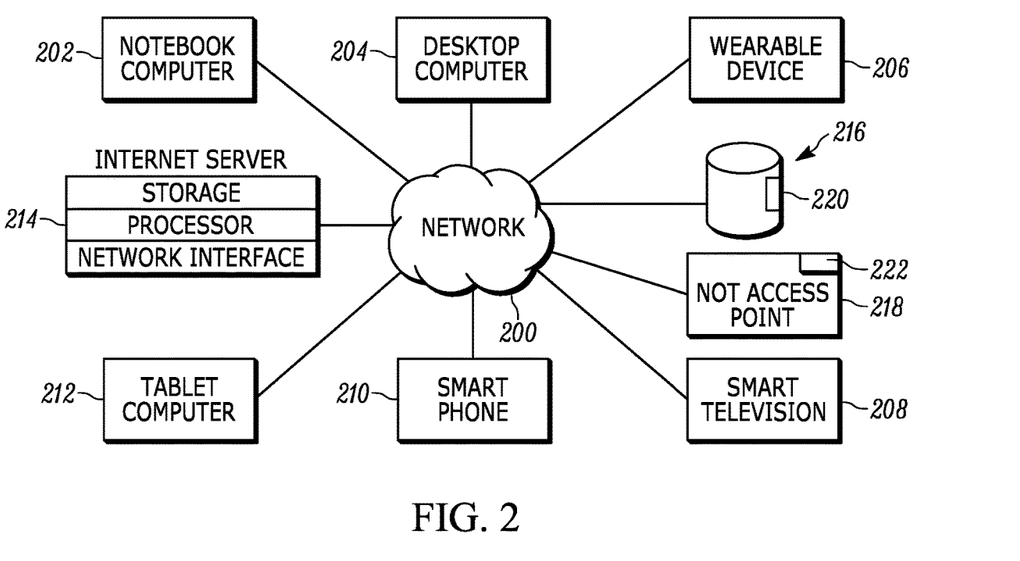
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a stand-alone digital assistant 216, a network access point 218, and a server 214 such as an Internet server that may provide cloud storage accessible to the devices 202-212, 216, 218. It is to be understood that the devices 202-218 are configured to communicate with each other over the network 200 to undertake present principles. The network 200 itself may be a local area network such as a Wi-Fi or other wireless or wired network providing Internet access.

Describing the stand-alone digital assistant 216 in more detail, it may include hardware such as a microphone, speakers, one or more processors, storage, a network interface, and other items mentioned above in reference to the system 100 for executing digital/personal assistant software, for processing voice inputs, and for providing audible outputs in accordance with present principles. Thus, the stand-alone digital assistant 216 may be similar to a Lenovo Smart Display virtual assistant that executes Google Assistant software, an Amazon Dot that executes Amazon Alexa software, or a Google Home device that executes Google Assistant software.

Additionally, in some embodiments the digital assistant 216 may include network access point hardware for operating the network 200 and allowing or denying other devices access to the network and/or access to the Internet through the network 200. For instance, the digital assistant 216 may include both modem and router hardware, including a network transceiver 220 for communicating with client devices within the network and providing them with access to the Internet.

Now describing the network access point 218, it may be a modem and/or router, and thus it may also include network access t hardware for operating the network 200 and allowing or denying other devices access to the network and/or access to the Internet through the network 200. For instance, the network access point 218 may include both modem and router hardware, including a network transceiver 222 for communicating with the other devices shown in FIG. 2 and providing them with access to the Internet.

Figure 3:
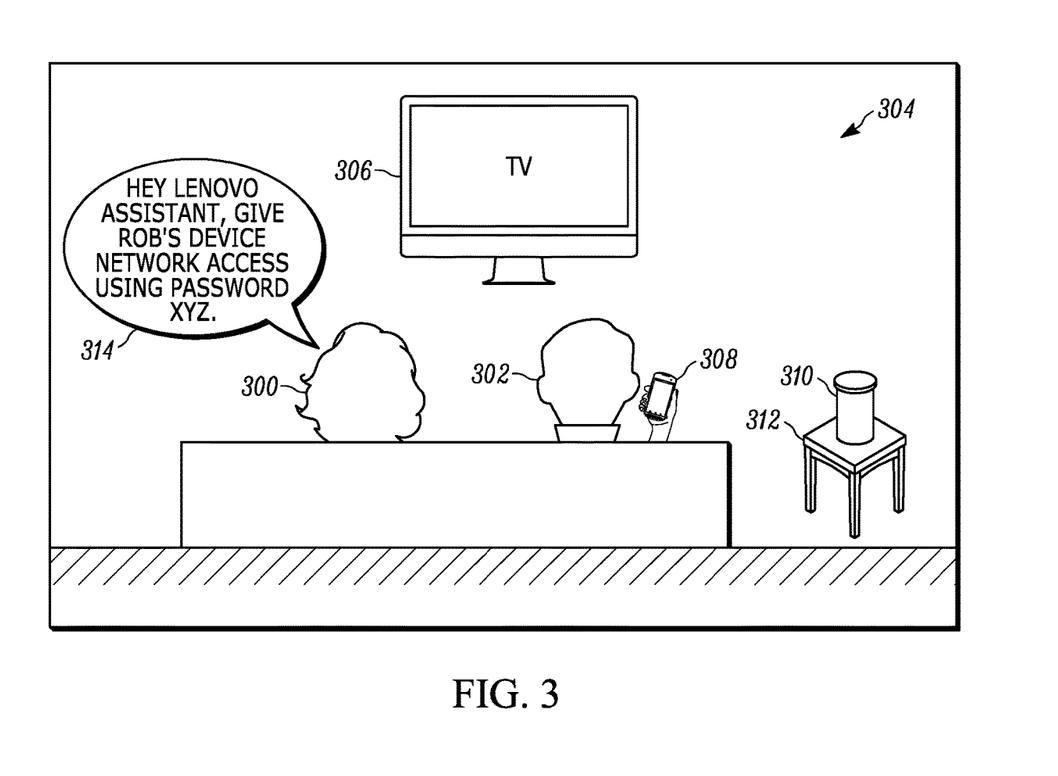
FIG. 3 is an illustration in accordance with present principles.

Referring to FIG. 3, it shows an example illustration in accordance with present principles. A first user 300 and a second user 302 are sitting in a living room 304 of a personal residence. The users 300, 302 are sitting on a couch watching audio video content presented on a television 306. Additionally, user 302 is holding his smart phone 308 in his hand and would like to connect to a local Wi-Fi network that provides Internet access to connected, approved devices within the personal residence. However, the network is protected by authentication protocols so that non-approved devices and/or unauthorized users may not connect to and use the network. For example, a username and password might normally have to be provided for accessing the network. Further, it is to be understood that user 300 is a resident of the personal residence and may be authorized to manage the network or otherwise has access to it.

Knowing that user 302 would like to connect to the network using the smart phone 308, the approved user 300 may provide voice input the stand alone personal assistant 310 shown sitting on a coffee table 312 adjacent to the users 300, 302. The voice input is represented by the illustrative speech bubble 314 that is shown. As may be appreciated from FIG. 3, user 300 first provides a cue or trigger to the assistant 310 ("Hey Lenovo assistant") which the assistant 310 processes as a cue/trigger that ensuing voice input will be provided that includes a task for the assistant 310 to perform.

The assistant 310 may monitor for and process the cue/trigger by keeping its microphone activated and monitoring input from the microphone to identify the predetermined cue/trigger using a digital signal processor (DSP) on the assistant 310 (or a field programmable gate array or another type of programmable logic device) that processes audible input received at the microphone, including voice input, to recognize the cue/trigger when provided. The DSP may be controlled by a digital assistant application executing at the assistant 310 and based on recognition of the cue/trigger, a central processing unit (CPU) or other separate general-purpose processor within the assistant 310 may take over monitoring microphone input for an ensuing task that might be provided by the user 300.

Alternatively, the DSP might not be controlled by the digital assistant application. Instead, based on the DSP recognizing the cue/trigger as "hard" programmed, it may indicate to the digital assistant application that ensuing voice input will be provided for processing. The DSP may then pass microphone control to the CPU so that the digital assistant application may then be executed by the CPU to monitor microphone input for an ensuing task that might be provided by the user 300.

In any case, subsequent to being triggered by the cue/trigger, the assistant 310 may process ensuing voice input and execute a task in conformance therewith. In the example shown in FIG. 3, the ensuing voice input includes a command to "give Rob's device network access using password XYZ". Rob is understood to be the name of user 302, and Rob's smart phone 308 might have already been programmed or associated with the name "Rob" (such as at initial registration of the phone with the manufacturer). Since Rob's smart phone 308 has already been associated with the name "Rob", the smart phone 308 might broadcast this device identifying information as part of its network discovery protocol. Based on that, a network access point that might be integrated with the assistant 310 may receive the device identifying information indicating the name "Rob" (e.g., "Rob's Lenovo smart phone") from the smart phone 308 during the network discovery process even though the phone 308 has yet to be authorized to use the network.

In accordance with present principles and also during the network discovery process, the network access point of the device 310 (or in communication with the device 310 using e.g., Remote Authentication Dial-In User Service (RADIUS) communication) might have transmitted information to the phone 308 for presentation on the display of the phone 308. This information might include a one-time use password to permit the phone 308 to communicate over the network. The one-time use password might only be useable for a threshold non-zero period of time that is not indefinite (e.g., twelve hours from the time the phone 308 is given access to the network) before the device 308 has to again connect to the network using a different one-time use password. The information transmitted to the phone 308 may also include a name of the phone 308 recognized by the network access point based on broadcasts by the phone 308.

Accordingly, it may be appreciated in this example that the network access point providing the password to the phone 308 may be how the user 300 knows the password ("XYZ") to provide back to the assistant 310 as part of the voice input represented by the speech bubble 314. However, also note that in this example just because the network access point broadcasts the password XYZ does not mean that anyone having the password XYZ may be able to access the network, and it might not even mean that user 302 can manually enter the password to a login screen presented on the display of the phone 308 to access the network as might typically happen.

Instead, to maintain security, the password might have to be audibly provided via voice input to the digital assistant 310. Furthermore, in some embodiments it might have to be provided by the user 300 specifically or another preregistered user that the device 310 would recognize using voice recognition as being a user authorized to control the device 310 and/or network access point to give network access. In doing so, security is established using a "geo-fencing" of sorts in which a user has to be close enough to the assistant 310 for the assistant 310 to receive and recognize voice input of the password from the user, while a relatively easy and intuitive way for users to connect their devices to the personal residence's network is still provided.

Additionally, note that in some embodiments a username for network access might not have to be provided with the voice input indicating the password. Instead, the network access point might already know other device identifying information for the device 308 that it can use instead of the username. Examples of such device identifying information include the media access control (MAC) address and/or Internet protocol (IP) address of the phone 308, as received from the phone 308 during the network discovery process. The network access point may thus associate or pair the one-time use password with the MAC and/or IP address of the phone 308 so that only the phone 308 may connect to the network using that specific one-time use password. Unique one-time use passwords for distribution may be maintained in a secure storage area of the assistant 310 and/or network access point.

Based on the foregoing, when the assistant 310 receives the voice input from user 300 indicating a command to give "Rob's device" network access using password "XYZ", the network access point managed by or in communication with the assistant 310 would already know what device is Rob's device based on the name "Rob" being indicated in the network discovery process along with the MAC and/or IP address for the phone 308. At this point the network access point would have already associated the phone 308 with the one-time use password "XYZ" and based on the password "XYZ" being provided back to the network access point via audible input to the assistant 310, the network access point may provide network access to the phone 308.

Another example in accordance with present principles will now be described, though not shown in FIG. 3. In any case, to still maintain the sort of geo-fencing for security that is afforded by using voice input to a digital assistant device for authentication of another device to access a LAN, a voice request for a password may be provided to the digital assistant device along with identifying information for another device to be connected to the network. Again, using facts from the example above, in this case the voice input to the digital assistant device might be "Hey Lenovo assistant, give me a password for Rob's device to use to access the LAN". The digital assistant device, responsive to receiving this password request, may then manage or communicate with a network access point to receive a one-time use password that the network access point has associated with Rob's device, as might have been done responsive to an initial network discovery process between the network access point and other device. The digital assistant device may then audibly provide that one-time use password indicated by the network access point via a speaker on the digital assistant or in communication therewith, which Rob might then hear and enter into a login screen presented on the display of his device for network access.

Figure 4:
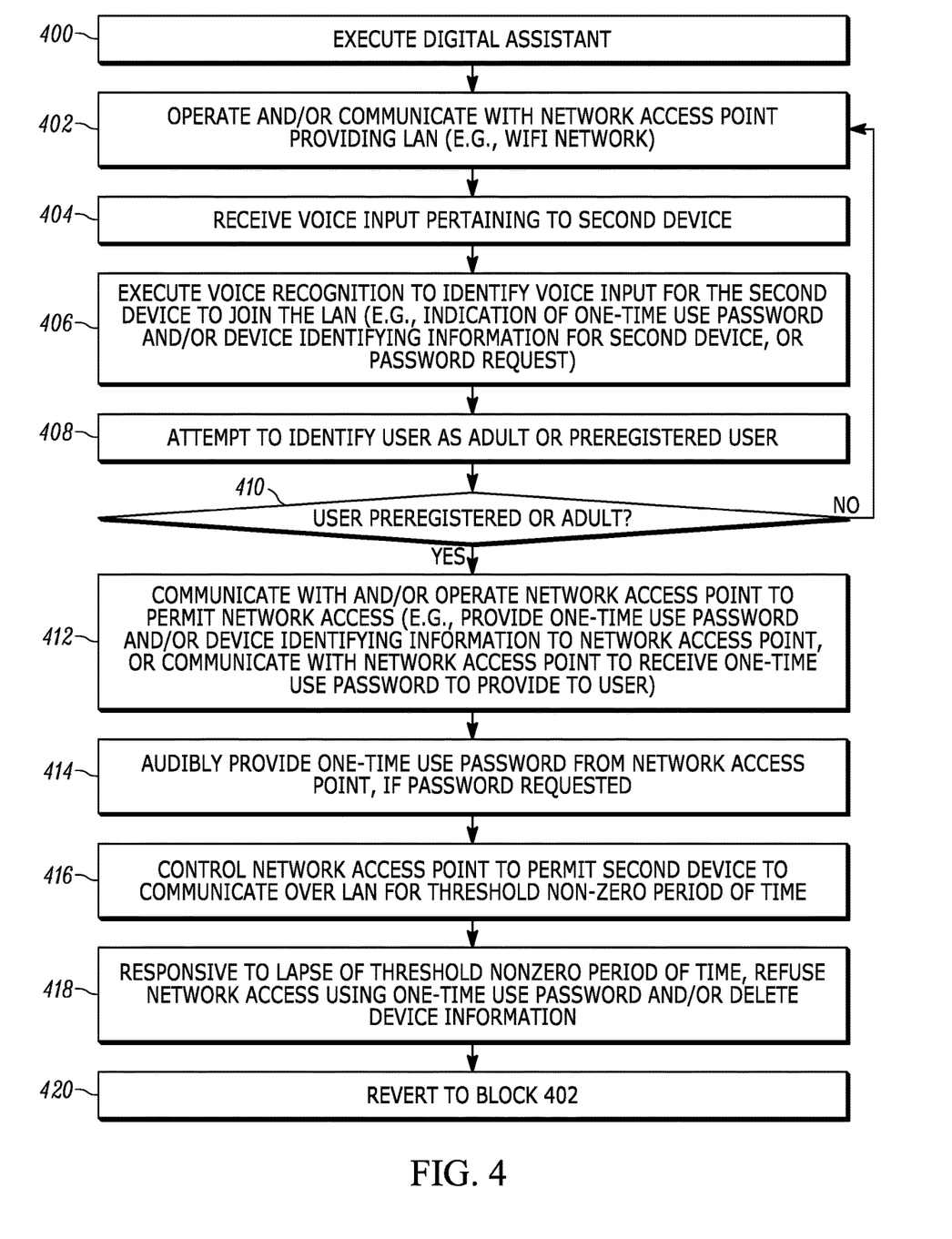
FIG. 4 is a flow chart of an example algorithm in accordance with present principles.

Present principles will now be further described in reference to FIG. 4, which shows example logic that may be executed by a first device such as the system 100 and/or a digital assistant device in accordance with present principles. Beginning at block 400, the first device may launch or otherwise begin executing a digital assistant application. The logic may then move to block 402 where the first device may operate a LAN via a network access point if the network access point's hardware has been integrated with the first device itself, or where the first device may communicate with the network access point if the network access point is embodied in a separate device.

From block 402 the logic may move to block 404 where the first device may receive voice input, via a microphone, that pertains to a second device. The voice input may include input providing identifying information for the second device along with a one-time use password that might have been presented on the display of the second device during the second device's network discovery process, such as described above in reference to FIG. 3. Additionally, or alternatively, the voice input received at block 404 may include a password request as also described above.

After block 404 the logic may then proceed to block 406 where the first device may, using the digital assistant application and voice recognition software, execute/perform voice recognition to identify the content of the voice input received at block 404, including a command or request for the second device to join the LAN. From block 406 the logic may then move to block 408.

At block 408 the first device may attempt to identify the user that provided the voice input received at block 404 as a preregistered user that is authorized to provide commands via the digital assistant for allowing other devices to connect to the network. The user may have been registered when setting up the LAN or configuring settings for the LAN, where the user might have provided sample voice inputs during such a calibration process to thus register the user as a user authorized to provide voice input for other devices to join the LAN.

Additionally, or alternatively, at block 408 the first device may execute voice recognition to determine, using voice recognition software, whether the person that provided the voice input is an adult or non-adult (such as a child or adolescent). The first device may do so by, e.g., comparing the voice pitch with which the voice input is provided to voice pitch templates stored at the first device to determine whether the voice of the person providing the input is indicative of the person being an adult or non-adult. This may be done for embodiments where the digital assistant and/or network access point has been configured to only process voice commands from adults for providing network access to other devices.

From block 408 the logic may next move to decision diamond 410. At diamond 410 the first device may determine, based on step 408, whether the user that provided the voice input received at block 404 is one or both of a preregistered user and an adult. Responsive to a negative determination at diamond 410, the logic may revert back to block 402 and proceed therefrom. However, responsive to an affirmative determination at diamond 410 the logic may instead proceed to block 412.

At block 412 the first device, via the digital assistant application, may communicate with and/or control the network access point to permit LAN access to the second device. Permitting LAN access may include providing the one-time use password and device identifying information to the network access point, as might have been received via the voice input received at block 404, for the network access point to allow the second device to communicate over the LAN. Additionally, or alternatively, permitting LAN access may also include communicating with the network access point to receive a one-time use password from the network access point so that it may subsequently be audibly provided to a user, who may then use the second device to enter the one-time use password into a login screen to access the LAN as described herein.

Thus, from block 412 the logic of FIG. 4 may then proceed to block 414 where the first device may, if applicable, audibly provide the aforementioned one-time use password via the digital assistant if a voice request for one has been received. The logic may then move to block 416.

At block 416 the first device may control the network access point to permit the second device to communicate over the LAN for a threshold non-zero amount of time if the first device is integrated with the network access point or otherwise communicates with it to control it. Otherwise, the network access point itself may permit the second device to communicate over the LAN for the threshold non-zero amount of time.

From block 416 the logic may then proceed to block 418. At block 418 the first device may, if controlling the network access point and responsive to lapse of the threshold non-zero amount of time, refuse or revoke LAN access to the second device using the one-time use password. Additionally, in some embodiments the first device may delete or purge some or all of the information pertaining to the second device that the first device might have stored for network access or otherwise.

However, note that in embodiments where the first device does not control the network access point but simply communicates with it, the steps described above in reference to block 418 may instead be executed by the network access point itself responsive to the lapse of the threshold non-zero amount of time.

From block 418 the logic may then proceed to block 420. At block 420 the logic may revert back to block 402 and proceed therefrom, where the first device may receive subsequent voice input for permitting the second device or other devices to access the LAN.

Figure 5:
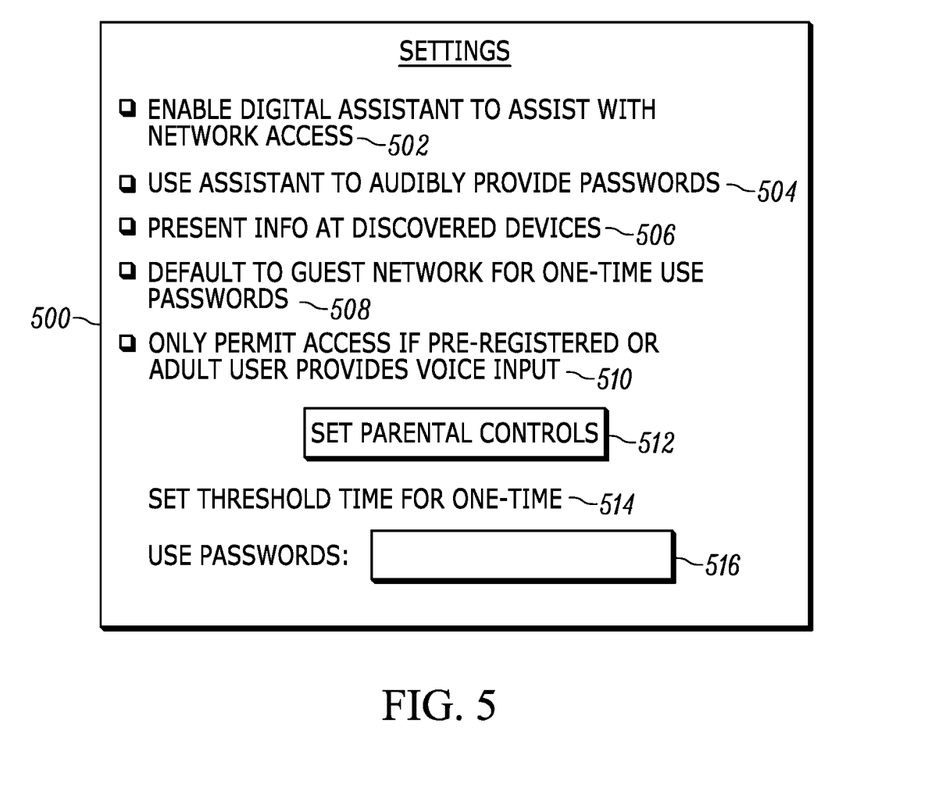
FIG. 5 is an example graphical user interface (GUI) in accordance with present principles.

Continuing the detailed description in reference to FIG. 5, it shows an example graphical user interface (GUI) 500 that may be presented on the display of a digital assistant device undertaking present principles (e.g., executing the logic of FIG. 4) and/or in communication with a digital assistant device undertaking present principles to configure settings of the digital assistant device. For each of the options and sub-options that will be described below, it is to be understood that the option may be selectable by directing touch or cursor input to the check box shown adjacent to the respective option.

Accordingly, the GUI 500 may include a first option 502 that is selectable to enable the digital assistant device to assist with other devices accessing a LAN. For instance, the first option 502 may be selected to cause the digital assistant device to execute the steps and tasks described above in reference to FIGS. 3 and 4. The first option 502 may even be accompanied by sub-options 504 and 506. Sub-option 504 may be selectable to enable the digital assistant device to audibly provide passwords upon request as described herein. Sub-option 506 may be selectable to enable the digital assistant device to receive voice input of device identifying information and passwords as described herein, as might have been presented on the display of another device seeking to join the LAN.

The GUI 500 may also include an option 508 that is selectable to configure the digital assistant device to default other devices using one-time use passwords to a guest LAN when, for instance, a network access point might provide two Wi-Fi networks with different levels of security. For example, the network access point might provide a guest network for guests and also a "regular" network for regular users and/or residents of a building in which the network access point is disposed.

Still further, the GUI 500 may include an option 510 that is selectable to enable the digital assistant device to only permit other devices to access the LAN when voice input to permit the other devices to access the LAN is identified as being received from a preregistered user and/or adult user, as described herein. Additionally, option 510 may be accompanied by a selector 512 that is selectable using touch or cursor input directed to the selector 512 to cause another GUI to be presented at which parental controls may be configured for what level of access (e.g., types of websites, types of social networking services, etc.) a child's device might be given when joining a LAN and applying parental controls/child security as described herein.

Still in reference to FIG. 5, the GUI 500 may also include a setting 514 for an end-user to select a particular threshold non-zero amount of time for which LAN access should be provided, e.g., using a one-time use password. Thus, an end-user may select input field 516 using touch or cursor input and then use a hard or soft keyboard to provide numerical/text input indicating a particular threshold non-zero amount of time for the digital assistant device and/or network access point to apply in accordance with present principles.

Moving on from FIG. 5, it is to be understood that a digital assistant device executing a digital assistant application in accordance with present principles need not necessarily be a stand-alone digital assistant device and/or one integrated with a network access point. For instance, the features discussed herein may also be executed using a smart phone, tablet computer, personal computer, etc.

It is to also be understood that other forms of biometric authentication in addition to or in lieu of voice recognition of a preregistered user's voice may be used in accordance with present principles. For instance, fingerprint authentication may be used where a preregistered user provides fingerprint input to a fingerprint reader on a digital assistant device or another device in communication therewith (the user's own smart phone display) for authentication.

Additionally, it is to be understood that still other multi-factor authentication may be performed for permitting LAN access. For instance, in addition to audibly providing or receiving a one-time use password for another user's device to access a LAN, a preregistered user might also be sent an email responsive to a LAN access attempt or request, and the email might indicate the device seeking access (e.g., by device name or other identifying information) and include a selector or link that the user may then select using cursor or touch input to confirm that the other user's device should be permitted to join the LAN.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:
1. A first device, comprising:
at least one processor;
a microphone accessible to the at least one processor; and
storage accessible to the at least one processor and comprising instructions executable by the at least one processor to:
execute a digital assistant;
receive, via the microphone, voice input pertaining to a second device different from the first device; and
based on the voice input, use the digital assistant to permit the second device to join a local area network (LAN);
wherein the voice input indicates a password; and
wherein the password is a one-time use password sent from a network access point to the second device, the network access point one or more of: being in communication with the first device, being operated by the first device.

2. The first device of claim 1, wherein the voice input indicates information that identifies the second device.

3. The first device of claim 2, wherein the information that identifies the second device comprises one or more of: a media access control (MAC) address for the second device, an Internet protocol (IP) address for the second device.

4. The first device of claim 2, wherein the information that identifies the second device comprises an end user-designated name for the second device.

5. The first device of claim 1, wherein the voice input comprises a command for the second device to be permitted to join the LAN.

6. The first device of claim 5, wherein the instructions are executable by the at least one processor to:

provide, responsive to receipt of the voice command, information indicated in the voice input to the network access point to permit the second device to join the LAN.

7. The first device of claim 1, wherein the LAN comprises a Wi-Fi network.

8. The first device of claim 1, wherein the instructions are executable by the at least one processor to:

based on the voice input, execute voice recognition to identify a particular user as providing the voice input; and responsive to identification of the particular user, use the digital assistant to permit the second device to join the LAN.

9. The first device of claim 1, comprising network access point hardware that operates the LAN.

10. The first device of claim 9, wherein the instructions are executable by the at least one processor to:

control the network access point hardware to permit the second device to communicate over the LAN for a threshold non-zero period of time that is not indefinite.

11. The first device of claim 1, wherein the instructions are executable to:

present, on a display, a graphical user interface (GUI) for configuring one or more settings of the first device, the GUI comprising an option that is selectable to enable the first device to receive respective voice inputs indicating respective passwords and to use the digital assistant to permit respective devices to join the LAN based on the respective voice inputs.

12. A method, comprising:

receiving, via a digital assistant, voice input pertaining to a device for the device to join a local area network (LAN);

recognizing the voice input as indicating a request for a password to join the LAN; and using, based on the voice input, the digital assistant to permit the device to join the LAN at least in part by audibly providing a one-time use password responsive to receipt of the request for the password.

13. The method of claim 12, comprising:

providing the one-time use password to a network access point that manages access to the LAN.

14. The method of claim 12, comprising:

recognizing the voice input as indicating identifying information for the device; and providing the identifying information to a network access point that manages access to the LAN.

15. The method of claim 12, comprising:

executing voice recognition to identify a preregistered user as providing the voice input; and communicating, responsive to identifying the preregistered user via the voice input, with a network access point that manages access to the LAN to permit the device to join the LAN.

16. The method of claim 12, comprising:

executing voice recognition to identify a non-adult as providing the voice input; and refusing, responsive to identifying the non-adult as providing the voice input, to communicate with the network access point to permit the device to join the LAN.

17. The method of claim 12, comprising:

presenting, on a display, a graphical user interface (GUI) for configuring one or more settings of the digital assistant, the GUI comprising an option that is selectable to enable the digital assistant to audibly provide respective one-time use passwords responsive to receipt of respective requests for passwords to join the LAN.

18. A computer readable storage medium (CRSM) that is not a transitory signal, the computer readable storage medium comprising instructions executable by at least one processor of a first device to:

receive, via a digital assistant, voice input pertaining a second device joining a network, the second device being different from the first device, wherein the voice input comprises a request for a password to join the network; and use the voice input to assist the second device in joining the network at least in part by audibly providing the password responsive to receipt of the request for the password.

19. The CRSM of claim 18, wherein the password is a one-time use password.

20. The CRSM of claim 18, wherein the instructions are executable to:

present, on a display, a graphical user interface (GUI) for configuring one or more settings of the digital assistant, the GUI comprising an option that is selectable to enable the digital assistant to audibly provide respective passwords responsive to receipt of respective requests for passwords to join the network.

* * * * *